US011170122B2

(12) United States Patent
Jäger et al.

(10) Patent No.: US 11,170,122 B2
(45) Date of Patent: Nov. 9, 2021

(54) METHOD FOR SECURE ACCESS TO DATA

(71) Applicant: UNISCON UNIVERSAL IDENTITY CONTROL GMBH, Munich (DE)

(72) Inventors: Hubert Jäger, Pullach (DE); Hans-Christian Perle, Wiesbaden (DE); Ralf Rieken, Munich (DE)

(73) Assignee: UNISCON UNIVERSAL IDENTITY CONTROL GMBH, Munich (DE)

( * ) Notice: Subject to any disclaimer, the term of this patent is extended or adjusted under 35 U.S.C. 154(b) by 0 days.

(21) Appl. No.: 16/545,445

(22) Filed: Aug. 20, 2019

(65) Prior Publication Data
US 2020/0019724 A1 Jan. 16, 2020

Related U.S. Application Data

(63) Continuation of application No. PCT/EP2018/051900, filed on Jan. 25, 2018.

(30) Foreign Application Priority Data

Feb. 21, 2017 (DE) ...................... 10 2017 103 519.2

(51) Int. Cl.
*G06F 21/62* (2013.01)
*G06F 21/60* (2013.01)

(52) U.S. Cl.
CPC ........ *G06F 21/6227* (2013.01); *G06F 21/604* (2013.01)

(58) Field of Classification Search
CPC ............... G06F 21/6245; G06F 21/604; G06F 21/6227; G06F 2221/2143

(Continued)

(56) References Cited

U.S. PATENT DOCUMENTS 8,812,875 B1 8/2014 Melvin
2006/0224902 A1* 10/2006 Bolt ........................ G06F 21/10
713/193

(Continued)

OTHER PUBLICATIONS

Chakraborty et al., "Functional Encryption for Secured Big Data Analytics", International Journal of Computer Applications, Dec. 18, 2014, pp. 19-22, XP055455727 DOI: 10.5120/18836-0359, Retrieved from the Internet [URL: https://pds.semanticscholar.org/4be6/96937454e64f7f75d2640dc7af594dbaa3a1.pdf.].

(Continued)

*Primary Examiner* — Benjamin A Kaplan
(74) *Attorney, Agent, or Firm* — Myers Wolin, LLC

(57) ABSTRACT

Provided are a system and a method for secure access to data, where the data comprises a number of data records each assigned to an entity, such as a user, and where the data records are stored in encrypted form in a database. A first decryption key assigned to a particular entity is used to decrypt the data records assigned to the particular entity. The first decryption keys are stored in a volatile memory, and the first decryption keys assigned to the particular entity are encrypted by an encryption key assigned to the particular entity, and the encrypted first decryption keys are stored in a permanent memory. After the volatile memory is cleared, the encrypted first decryption keys are copied from the permanent memory into the volatile memory, and in the volatile memory, the first decryption keys are decrypted by a second decryption key assigned to the particular entity.

6 Claims, 2 Drawing Sheets

(58) Field of Classification Search
USPC .............................................................. 726/1
See application file for complete search history.

(56) References Cited

U.S. PATENT DOCUMENTS

| | | | |
|---|---|---|---|
| 2011/0311055 A1* | 12/2011 | Parann-Nissany | G06F 21/604 380/278 |
| 2015/0288512 A1* | 10/2015 | McGregor | H04L 9/0861 713/193 |
| 2015/0347770 A1* | 12/2015 | Whalley | G06F 21/6245 726/30 |
| 2019/0028273 A1* | 1/2019 | Harras | H04L 9/0863 |

OTHER PUBLICATIONS

Hamlin et al., "Cryptography for Big Data Security". International Association for Cryptologic Research, vol. 20160106:210558, Jan. 6, 2016, pp. 1-50, XP061019977.
International Search Report issued for corresponding International Patent Application No. PCT/EP2018/051900, dated Mar. 9, 2018.

\* cited by examiner

METHOD FOR SECURE ACCESS TO DATA

CROSS REFERENCE TO RELATED APPLICATIONS

The present application is a continuation of International Application No. PCT/EP2018/051900, filed on Jan. 25, 2018, and claims priority of German Application No. 10 2017 103 519.2, filed on Feb. 21, 2017, the contents of which are incorporated herein by reference.

FIELD OF THE INVENTION

The invention relates to a method and to a system for secure access to data. In particular, the invention relates to a method and system for continued secure access to data after the access policies for accessing said data have been changed.

BACKGROUND OF THE INVENTION

In businesses, an increasing amount of data on customers (or other natural or legal persons) is being stored. It is known in the prior art to encrypt said customer data in this process. However, customer data of this kind is increasingly being analyzed not only by the company collecting the data itself, for example as part of big data analysis, but also by third parties.

To allow analysis that is compliant with data protection, it is known to anonymize the data. However, analyses of this kind, whether by the data-collecting company or by third parties, can or should only be possible with the consent of the customer. In this process, the customer can give the data-collecting company explicit consent for a certain type of analysis. In this regard, it is known for it to be only possible to decrypt the data by means of a decryption key for the particular customer in order to then analyze said data. However, said decryption keys have to be made available to the data-collecting company so that practicable analysis is at all possible. Decrypting the data via the customer at the time of the analysis is not possible for purely logistical reasons.

However, the disadvantage here is that despite the customer's explicit consent for only a certain type of analysis, the company can also analyze the data for other purposes, since the company is in possession of the decryption keys. Data could therefore also be analyzed in a different way without the customer's consent.

OBJECT OF THE INVENTION

The object of the present invention is therefore to avoid the drawbacks known from the prior art, in particular to provide solutions which make it only possible for analyses to be carried out for other purposes within the control of the customer or the owner of the data.

SOLUTION ACCORDING TO THE INVENTION

According to the invention, said object is achieved by a method and a system according to the independent claims. Advantageous embodiments and further developments of the invention are specified in the dependent claims. Features and details described in connection with the method according to the invention also apply in connection with the system according to the invention and vice versa; thus, with respect to the disclosure of the individual aspects of the invention, reference can always be made reciprocally.

Provided is a method for secure access to data, wherein the data comprises a number of data records, wherein
    the data records are each assigned to an entity, preferably a user, and
    the data records are stored in encrypted form in a database, wherein a first decryption key assigned to a particular entity is used to decrypt the data records assigned to the particular entity,
    the first decryption keys are stored only in a volatile memory,
    the first decryption keys assigned to the particular entity are encrypted by an encryption key assigned to the particular entity, and the encrypted first decryption keys are stored in a permanent memory, and
    after the volatile memory is cleared
        the encrypted first decryption keys are copied from the permanent memory into the volatile memory, and
        in the volatile memory, the first decryption keys are decrypted by a second decryption key assigned to the particular entity.

Thus, the unencrypted first decryption keys provided for decrypting the data can advantageously be deleted or destroyed, for instance if the purpose of the data analysis is changed. At the same time, however, by encrypting the first decryption keys and storing the encrypted first decryption keys, it is ensured that the first decryption keys can be restored after the owner of the data has given consent. In this regard, it is particularly advantageous for big data analysis that not only data collected in the future can be analyzed according to the new purpose, but also the data already collected before the change to the purpose of the data analysis can be analyzed according to the new purpose.

In this regard, it is advantageous if the encryption keys for encrypting the first decryption keys and the second decryption keys for decrypting the encrypted first decryption keys are generated by a secret provided by the particular entity, the secret being provided by the particular entity separately for the generation of the encryption keys and for the generation of the second decryption keys. That is, the secret is provided once to generate the encryption keys and on a separate occasion to generate the second decryption keys.

By providing the secret for generating the second decryption keys, the particular entity, such as a customer, can consent to the decryption of the data and to the analysis of the data according to the new purpose.

It has proven to be advantageous if the secret is discarded or deleted both after the generation of the encryption keys and after the generation of the second decryption keys. This ensures that the encrypted first decryption keys cannot be restored without the consent of the particular entity.

The encryption keys may be deleted after the encryption of the first decryption keys or stored only in the volatile memory.

The second decryption keys may be deleted or stored only in the volatile memory after the decryption of the encrypted first decryption keys.

Advantageously, access to the data records encrypted in the database is handled by an access control device; access policies that indicate who can access the encrypted data records, and for what purpose, are stored in the access control device.

In this regard, it has proven to be particularly advantageous if all content in the volatile memory is deleted if the access policies are changed. This ensures that the data records stored in encrypted form in the database cannot be accessed without the consent of the particular entity. This is because access is only possible after the first decryption keys have been restored, which requires the consent of the particular entity. The particular entity gives this consent by providing the secret after the volatile memory has been cleared.

If the encryption keys and/or the second decryption keys are stored only in the volatile memory, it is thus also ensured that said keys are deleted or destroyed together with the first decryption keys, for instance if the purpose of the data analysis is changed.

It is particularly advantageous if the access control device is physically coupled to the volatile memory (i.e. hardwired), the access control device being restarted if the access policies are changed, and the volatile memory also being restarted on account of the physical coupling. Restarting the access control device thus causes the volatile memory to be restarted as well. If the volatile memory is restarted, all content in the volatile memory is deleted, i.e. all keys stored in the volatile memory are deleted or destroyed. In addition, if the volatile memory is restarted, any back-up copies of the volatile memory are also deleted. Advantageously, no back-up copies (e.g. dumps) of the volatile memory are generated if the volatile memory is restarted.

It is advantageous if the database, the volatile memory, the permanent memory and the access control device are part of a secure environment. The secure environment ensures that neither the operator of the infrastructure nor any other third party can access the data. Access to the data is only possible via special interfaces. In this regard, it is advantageous if the analysis of the data (big data analysis) is also carried out in the secure environment and only the results of the analysis are outputted or leave the secure environment.

The invention further provides a system adapted to carry out the method according to the invention.

BRIEF DESCRIPTION OF THE DRAWINGS

Details and features of the invention and specific embodiments of the invention will become apparent from the following description in conjunction with the drawings, the invention not being limited to the embodiments described below. In the drawings.

DETAILED DESCRIPTION OF THE INVENTION

Figure 1:
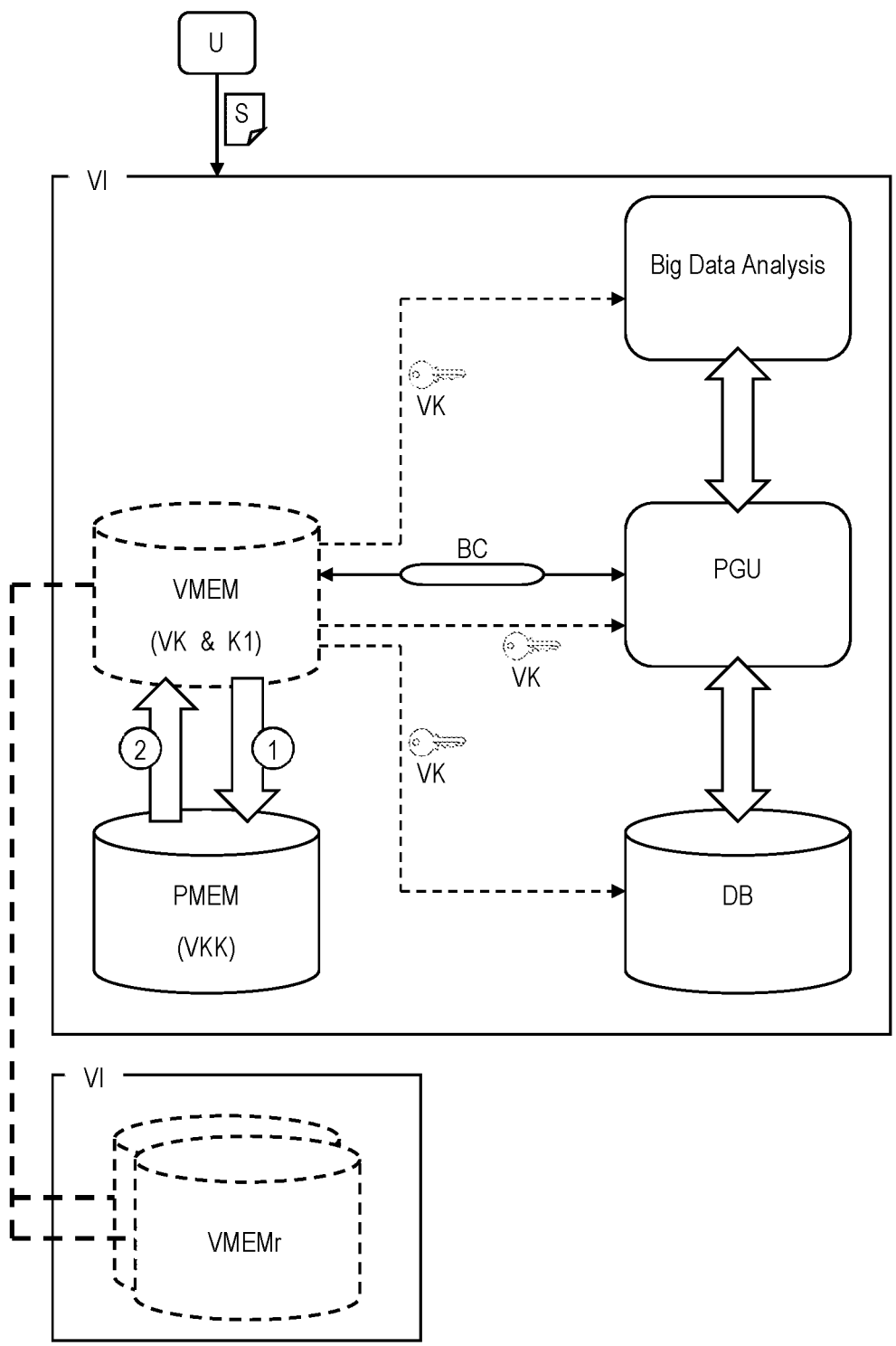
FIG. 1 shows an example of a system according to the invention for secure access to data.

FIG. 1 shows an example of a system according to the invention or an architecture according to the invention.

Data on an entity U is stored in a database DB. The entity U may be, for example, a customer of a company, a user of a system or any other natural or legal person. The entity U provides data, which is stored in the database DB. The data on the entity U may be collected in different ways. For example, the data may be transmitted from a terminal assigned to the entity U. The terminal may be a mobile phone or even a vehicle, for instance. In the case of a vehicle, vehicle data may be recorded and stored in the database. The vehicle data may include travel routes, driving style (passive/aggressive), driving times, etc., but also road damage, signage, obstacles, etc. Thus, for example, signage recorded by a sensor may be compared with signage stored in map data in order to correct erroneous map data, for instance. Said data and other vehicle data can be used to allow long-term mobility data research.

According to the invention, access to the user-related data stored in the database DB is only intended to be possible if the particular user has consented to the corresponding use of the data.

The example below is based on a first use and a second use of the data, with the second use of the data being different from the first use of the data. The first use may be a particular first analysis of the data, for instance, and the second use may be a particular second analysis of the same data. In general, however, the invention is not limited to two uses, but can also be applied analogously to n uses.

The data is stored in encrypted form in the database DB. As soon as data is first recorded by an entity U, the entity has to consent to the first use. In one embodiment of the invention, the entity U may give consent before the data is first recorded. Consent for the first use implies that for the decryption of the data stored in the database, corresponding first decryption keys VK are generated. According to the invention, said first decryption keys VK are stored in a volatile memory VMEM. Preferably, different first decryption keys VK are assigned to each entity U.

To access the data stored in the database DB, the corresponding first decryption keys VK are read from the volatile memory VMEM and transferred to the unit accessing the database. In the system shown in FIG. 1, said accessing unit may be the unit performing the analysis (big data analysis) or the access control device PGU, which monitors the access to the data in the database DB. Alternatively, the first decryption key VK may also be made available to the database DB, which then internally decrypts the data when said data is accessed.

At the same (or almost the same) time as the generation of the first decryption keys VK, said decryption keys are encrypted. To encrypt the first decryption keys VK, an encryption key K1 is required. The encryption keys K1, which are each assigned to an entity, are generated on the basis of a secret S. Each entity U provides the system with a corresponding secret S. The secret S may be a password, passphrase, a token or any other secret information known only to the entity U.

As a result, the first decryption keys VK are then in a decrypted form (VK) and in an encrypted form VKK. The encrypted first decryption keys VKK are then stored in a permanent memory PMEM, as illustrated in FIG. 1 by the arrow 1. The secret S is deleted or discarded after the generation of the encryption keys K1.

The system or the particular unit accessing the database DB can now, according to the first use, read the data from the database DB and decrypt said data using the first decryption key VK.

Now the data stored in the database DB is to be accessed according to the second use. However, the entities U have thus far only consented to the first use.

So that the entities U, or at least some of the entities U, explicitly consent to the second use, according to the invention the first decryption keys VK stored in the volatile memory VMEM are deleted or destroyed. This can be achieved by clearing the volatile memory VMEM, for instance by cutting off the power supply to the volatile memory for a certain period of time (e.g. 5 seconds). Thus, the encryption key K1 is also deleted. At this point in time, the system is now in a state in which the data stored in the database DB can be read but can no longer be decrypted.

This is because the first decryption keys VK stored in decrypted form in the volatile memory VMEM have been deleted.

If first decryption keys VK are stored or temporarily stored in the units accessing the database DB, said first decryption keys VK are also deleted or destroyed.

For example, for reasons of performance, a first decryption key VK provided to the access control device PGU may be stored in the access control device so that said key does not have to be re-requested by the volatile memory VMEM each time. In this case, the first decryption key VK stored in the access control device would also be deleted or destroyed.

According to the invention, the encrypted first decryption keys VKK are now read from the permanent memory PMEM and written into the volatile memory VMEM, as shown in FIG. 1 by the arrow 2. So that the encrypted first decryption keys VKK can be decrypted, the particular entity U has to reprovide the system with the secret S. The reprovision of the secret S can be considered to be the consent of the particular entity U for the second use of the data.

From the reprovided secret S, a second decryption key K2 is then generated in the system, and by means of said second decryption key the encrypted first decryption keys VKK are decrypted. The decryption of the encrypted first decryption keys VKK preferably takes place in the volatile memory VMEM. After the decryption of the encrypted first decryption keys VKK, the encrypted first decryption keys VKK in the volatile memory can be deleted such that only the decrypted first decryption keys VK are still stored in the volatile memory. The encrypted first decryption keys VKK are still stored in the permanent memory PMEM.

Within the scope of the second use, the system can now access the data stored in the database DB, at least insofar as the entities U have consented to said second use by reproviding the secret S.

For a third and any further use of the data, the aforementioned steps are carried out again, i.e. essentially:
 clearing the volatile memory VMEM
 receiving a secret S from the entity U
 generating corresponding second decryption keys K2 on the basis of the secret S
 decrypting the encrypted first decryption keys VKK by means of the particular second decryption key K2, and
 storing the decrypted first decryption keys VK in the volatile memory VMEM.

Furthermore, the system comprises an access control device PGU (policy gate unit), by means of which access to the data in the database DB is handled. On the basis of a number of access policies that may be stored in the access control device PGU, the access control device PGU determines who can access the data in the database DB and in what way. Said access policies therefore define the use of the data.

If the access policies are changed, this corresponds to a change to the use of the data.

To force the entities U, or at least some of the entities U, to consent to said changed access policies and thus to the changed use of the data, firstly the access control device PGU is restarted after a change to the access policies. Secondly, the access control device PGU is physically coupled, i.e. preferably hard-wired, to the volatile memory VMEM (boot coupling BC) such that a restart of the access control device PGU causes a restart of the volatile memory VMEM.

The volatile memory VMEM can be restarted, for instance, by cutting off the power supply to the volatile memory VMEM for a certain time. The content of the volatile memory VMEM, and thus the first decryption keys VK, is thereby lost or deleted. Any back-up copies of the volatile memory VMEM are also deleted. After the restart of the volatile memory VMEM, the consent of the particular entity U for the continued use of the data can only be given by the provision of the particular secret S, as described above.

The units of the system shown in FIG. 1 may be part of a secure environment VI, which ensures that neither the operator of the system nor any other third party can access the data or keys. Access can only be gained via specially configured interfaces.

The secure environment VI may comprise a network area, at least one processing area and a memory area, with the network area, the processing area and the memory area being physically separate from one another. The network area and the processing area may be coupled to one another via an internal communication network, as may the processing area and the memory area.

The secure environment VI may also comprise an access controller adapted to monitor and control access to the network area, the processing area and the memory area, and to prevent access to unencrypted data. The access controller may comprise an access control unit and a number of sensor/actuator units coupled to the access control unit, wherein at least one sensor/actuator unit is assigned to each network area, each processing area and each memory area, each sensor/actuator unit comprises at least one sensor and/or actuator, and the access control unit is adapted to control the sensor/actuator units. The at least one sensor and/or actuator may be selected from the group comprising at least a handle controller, a power switch, a rack sensor, a door sensor and combinations thereof.

The network area may be adapted to handle communication between the system VI and an external system (e.g. a client) via a communication network, it being possible for the network area to be further adapted to transmit and receive data in encrypted form.

It is advantageous if the processing area is adapted to receive data from the memory area and/or from the network area, to process the received data and to transmit the processed data to the memory area and/or to the network area. The data to be transmitted to the network area may be encrypted beforehand.

This makes it possible for big data analysis to be carried out entirely within the secure environment and for only the results of the analysis to be required to leave the secure environment.

In the system according to the invention, the volatile memory VMEM may be designed to be redundant. For this purpose, one or more redundant volatile memories VMEMr are provided, which are coupled to the volatile memory VMEM via a secure network connection. The redundant volatile memories VMEMr and the volatile memory VMEM may be arranged in the same secure environment VI. Alternatively, the redundant volatile memories VMEMr may also be arranged in another secure environment VI, as shown in FIG. 1. In yet another alternative, each of the redundant volatile memories VMEMr may be arranged in a separate secure environment.

The redundant volatile memories VMEMr may be used, for example, to restore the volatile memory VMEM using the redundant volatile memories VMEMr after a system failure.

However, if the access control device PGU is restarted, not only is the volatile memory VMEM restarted, along with the deletion of the keys VK stored therein, but all the redundant volatile memories VMEMr are also restarted. This means that all the first decryption keys VK stored in the redundant volatile memories VMEMr are also deleted or destroyed.

Figure 2:
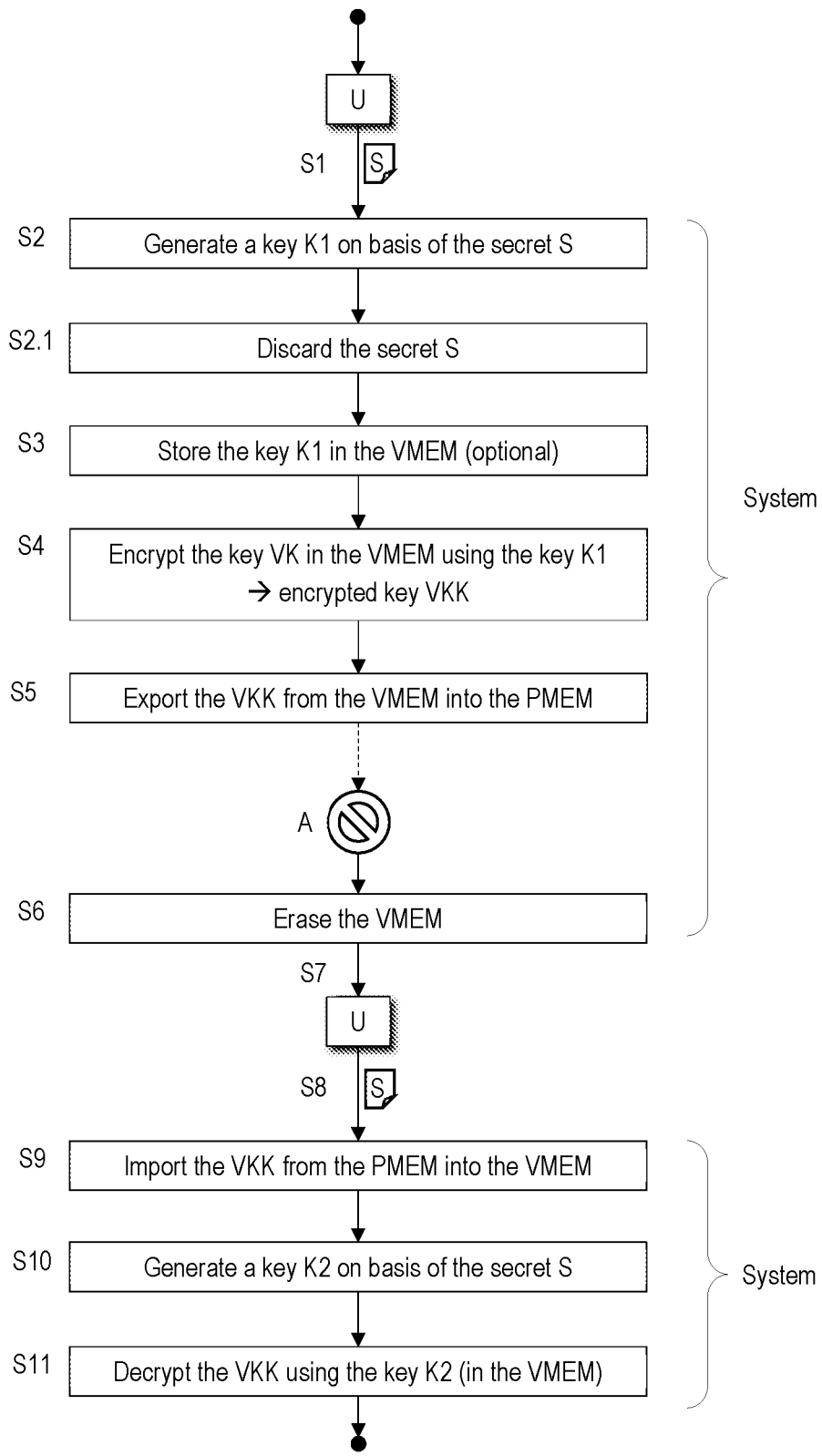
FIG. 2 shows a flow chart for a method according to the invention for secure access to data.

FIG. 2 shows a flow chart for an example of a method according to the invention for secure access to data.

In the flow chart of the method according to the invention, as shown in FIG. 2, it is assumed that data is already stored in encrypted form in the database DB and the corresponding first decryption keys VK for each entity U are stored only in the volatile memory VMEM.

In a first step S1, the entity U provides a secret S, which is made available to the system or transmitted to the system.

In a second step S2, the system generates, using the secret S, an encryption key K1 provided for encrypting the first decryption keys VK. The secret S can then be deleted or discarded (step S2.1).

Optionally, the encryption key K1 may be stored in the volatile memory VMEM (step S3).

In a further step S4, the first decryption keys VK assigned to the particular entity are encrypted using the encryption key K1, resulting in encrypted first decryption keys VKK. It should be mentioned at this juncture that a plurality of first decryption keys VK may be assigned to each entity. Thus, for example, new keys for encrypting the data in the database DB and thus new first decryption keys VK may be generated at regular intervals (e.g. hourly, daily or weekly) for each entity U.

The encrypted decryption keys VK are then stored in a permanent memory PMEM in step S5.

Steps S4 and S5 are carried out for each new first decryption key VK generated in the volatile memory VMEM, preferably immediately after the generation of a new first decryption key VK. This has the advantage that at any one time, for each first decryption key VK stored in the volatile memory VMEM, a corresponding encrypted first decryption key VKK is present in the permanent memory PMEM. The volatile memory VMEM can thus be cleared at any time, without first decryption keys VK actually being lost.

It is particularly advantageous if the generation of a first decryption key VK in the volatile memory VMEM and steps S4 and S5 are carried out as an atomic action. An atomic action means that the process of generating a first decryption key VK may not be interrupted until step S5 in order to avoid inconsistencies between the first decryption keys VK in the volatile memory VMEM and the encrypted first decryption keys VKK in the permanent memory PMEM.

For this purpose, the restart of the volatile memory VMEM, as described in connection with FIG. 1, may be delayed until the associated steps S4 and S5 have also been completed after the generation of a first decryption key VK. This delay may be achieved, for example, by a control unit or an operator of the volatile memory preventing the volatile memory from restarting until the atomic action(s) has/have been completed.

When a first decryption key VK is generated, a corresponding flag may be set in the volatile memory or in a register of the control unit, it only being possible to reset said flag again from step S5. Only when all flags have been reset can the VMEM volatile memory be restarted. As an alternative to the flags, a counter may also be provided that is counted up when a first decryption key VK is generated and counted down again by step S5, such that the volatile memory VMEM cannot be restarted until the counter has the value zero or the original state thereof. To avoid a deadlock or an infinite loop, it is not possible to generate any more new first decryption keys VK after the requested restart of the volatile memory VMEM—only the atomic actions can be completed.

In step A, the access policy described with reference to FIG. 1 is changed, which immediately leads to a restart of the access control device PGU and thus to a restart of the volatile memory VMEM, the volatile memory VMEM preferably being configured such that all atomic actions are concluded before the volatile memory VMEM is restarted and thus all the first decryption keys VK stored in the volatile memory are deleted.

Restarting the volatile memory causes the volatile memory VMEM to be cleared in step S6.

Following the restart of the volatile memory, the entity U is requested in step S7 to give the operator of the system the consent for a new/further use of the data. The consent is given by the entity U renotifying the system of the secret S in step S8.

After the renotification/retransmission of the secret S by the entity U, the encrypted first decryption keys VKK assigned to the entity U are copied from the permanent memory PMEM into the volatile memory VMEM in step S9.

Subsequently, in step S10, on the basis of the retransmitted secret S, a second decryption key K2 is generated, by means of which the encrypted first decryption keys VKK copied into the volatile memory VMEM are decrypted in step S11. The first decryption keys assigned to the entity U are then in decrypted form (VK) again in the volatile memory VMEM and can be used to decrypt the data assigned to the entity U and stored in the data DB, specifically for the further use.

This makes it possible for a user to be required to consent to the new/further use of the data and also for the already available data to be accessible for the new/further use. Furthermore, this may also prevent the data from being exposed to potential abuse due to a changed access policy, since the first decryption keys VK in the volatile memory VMEM are automatically deleted when the access policy is changed and said keys cannot be restored until the particular entity has given consent.

Instead of a change to a policy, the clearing of the volatile memory VMEM may also be triggered by an attack on the system. In this case too, the first decryption keys VK cannot be restored until the particular entity has given consent (by retransmitting the secret S).

LIST OF REFERENCE NUMERALS

BC Boot coupling (physical coupling between the volatile memory VMEM and the access control device PGU)
DB Database in which the data is stored (in encrypted form)
K1 Encryption key for encrypting the first decryption keys VK
K2 Second decryption key for decrypting the encrypted first decryption keys VKK
PGU Access control device (policy gate unit)
PMEM Permanent memory
S Secret, e.g. password, token, etc.
S1-S11 Steps of the method according to the invention
U Entity to which the data belongs, such as a user
VI Secure environment
VK First decryption key for decrypting the data
VKK Encrypted first decryption key VK
VMEM Volatile memory
VMEMr Redundant volatile memory VMEM

The invention claimed is:

1. Method for secure access to data, wherein
the data comprises a number of data records, wherein
the data records are each assigned to a particular entity (U) of a plurality of entities, preferably a user, and
the data records are stored in encrypted form in a database (DB), wherein a first decryption key (VK) assigned to the particular entity (U) is used to decrypt the data records assigned to the particular entity,
the first decryption keys (VK) are stored in a volatile memory (VMEM),
the first decryption keys (VK) assigned to the particular entity (U) are encrypted by an encryption key (K1) assigned to the particular entity (U) (S4), and the encrypted first decryption keys (VKK) are stored in a permanent memory (PMEM) (S5), and
after the volatile memory (VMEM) is cleared (S6)
the encrypted first decryption keys (VKK) are copied from the permanent memory (PMEM) into the volatile memory (VMEM) (S9), and
in the volatile memory (VMEM), the encrypted first decryption keys (VKK) are decrypted by a second decryption key (K2) assigned to the particular entity (U),
wherein the access to the data records encrypted in the database (DB) is handled by an access control device (PGU), wherein access policies indicating who can access the encrypted data records and for what purpose are stored in the access control device (PGU), and
wherein all content in the volatile memory (VNEM) is deleted if the access policies are changed.

2. The method of claim 1, wherein the encryption keys (K1) and the second decryption keys (K2) are generated by means of a secret (S) provided by the particular entity (U), wherein the secret (S) is provided by the particular entity (U) separately for the generation of the encryption keys (K1) (S1) and for the generation of the second decryption keys (K2) (S8).

3. The method of claim 2, wherein the secret (S) is discarded or deleted after each of the generation (S2) of the encryption keys (K1) and the generation (S10) of the second decryption keys (K2) (S2.1; S10.1).

4. The method of claim 1, wherein the encryption keys (K1) are deleted or stored only in the volatile memory (VMEM) after the encryption (S4) of the first decryption keys (VK).

5. The method of claim 1, wherein the second decryption keys (K2) are deleted or stored only in the volatile memory (VMEM) after the decryption (S11) of the encrypted first decryption keys (VKK).

6. The method of wherein the access control device (PGU) is physically coupled to the volatile memory (VMEM), wherein if the access policies are changed, the access control device (PGU) is restarted, the volatile memory (VMEM) is also restarted on account of the physical coupling, and the first decryption keys (VK) stored in the volatile memory (VMEM) are deleted.

* * * * *